United States Patent [19]
Cecil

[11] Patent Number: 5,645,738
[45] Date of Patent: Jul. 8, 1997

[54] APPARATUS AND METHOD FOR RESISTANCE WELDING TUBULAR PARTS

[76] Inventor: Dimitrios G. Cecil, 1277 Ashover Dr., Bloomfield Hills, Mich. 48304

[21] Appl. No.: 528,716

[22] Filed: Sep. 15, 1995

[51] Int. Cl.$^6$ ................................................ B23K 11/24
[52] U.S. Cl. ........................ 219/110; 219/56; 219/59.1; 219/117.1
[58] Field of Search ...................... 219/56, 56.1, 59.1, 219/109, 110, 117.1, 119

[56] References Cited

U.S. PATENT DOCUMENTS

| | | | |
|---|---|---|---|
| 2,467,636 | 4/1949 | Stoudt et al. | 219/119 |
| 2,967,228 | 1/1961 | Tindall | 219/119 |
| 3,433,921 | 3/1969 | Peterson | 219/110 |
| 3,581,047 | 5/1971 | Mitchell, Jr. | 219/91 |
| 3,842,235 | 10/1974 | Opprecht | 219/83 |
| 4,214,142 | 7/1980 | Crosby et al. | 219/86.25 |
| 4,296,304 | 10/1981 | Defourny | 219/86.41 |
| 4,317,980 | 3/1982 | Goodrich et al. | 219/117.1 |
| 4,441,006 | 4/1984 | Machida et al. | 219/85 CM |
| 4,447,700 | 5/1984 | Cohen | 219/117.1 |
| 4,461,944 | 7/1984 | Cohen | 219/110 |
| 4,542,277 | 9/1985 | Cecil | 219/109 |
| 4,684,778 | 8/1987 | Cecil | 219/89 |
| 4,795,875 | 1/1989 | Urech | 219/84 |
| 4,841,113 | 6/1989 | Hamada et al. | 219/110 |
| 4,861,959 | 8/1989 | Cecil | 219/89 |
| 4,984,171 | 1/1991 | Tsujii | 364/477 |
| 5,220,145 | 6/1993 | Cecil et al. | 219/110 |
| 5,225,647 | 7/1993 | Dufrenne | 219/86.51 |
| 5,288,968 | 2/1994 | Cecil | 219/89 |
| 5,360,156 | 11/1994 | Ishizaka et al. | 228/17.5 |
| 5,376,766 | 12/1994 | Higgins | 219/61.5 |

OTHER PUBLICATIONS

Lucas Schaevitz, LVDT (Linear Variable Displacement Transducer) Operating Instructions, Jul. 1994.

C.L. Tsai, O.A. Jammal, J.C. Papritan and D.W. Dickinson, "Modeling Resistance Spot Weld Nugget Growth", Welding Research Council, Bulletin 361, Feb. 1992, pp. 47–54.

David Bacon, "Controlling Resistance Welds With Deflection Feedback", Square D Company, Sep. 11, 1991.

A.E. Bentley, "Control of Pinch Welding Uses Quantitative Feedback Theory", Welding Journal, Jun. 1991, pp. 51–63.

C.L. Tsai, W.L. Dai, D.W. Dickinson, "Analysis and Development of a Real–Time Control Methodology in Resistance Spot Welding", SAE Technical Paper Series, No. 910191.

A. Stiebel, C. Ulmer, D. Kodrack and B. Holmes, "Monitoring and Control of Spot Weld Operations", SAE Technical Paper Series, No. 860579.

C.L. Tsai, W.L. Dai, D.W. Dickinson and J.C. Papritan, "Analysis and Development of a Real–Time Control Methodology in Resistance Spot Welding", Welding Research Supplement, Dec. 1991.

*Primary Examiner*—Clifford C. Shaw
*Attorney, Agent, or Firm*—Brooks & Kushman P.C.

[57] ABSTRACT

An apparatus and method for resistance welding tubular parts. The apparatus includes a weld gun having electrodes with arcuate contact faces engaging the parts. The electrodes are displaceable relative to each other. The contact faces are designed to distribute the force applied to the parts to prevent deformation and to hold the parts together steadily in order to minimize the amount of undesired electrode displacement caused by these effects. A test computer monitors the amount of electrode displacement occurring as a result of penetration of the parts into each other during welding. When the displacement between the electrodes falls within a predetermined displacement range, which is indicative of a proper weld between the parts, the computer cooperates with a weld controller to terminate the welding power, thereby inhibiting any substantial further penetration of the parts. The apparatus and method is suitable for tube-to-tube and wire-to-tube applications commonly performed in the manufacture of automobile seats.

27 Claims, 6 Drawing Sheets

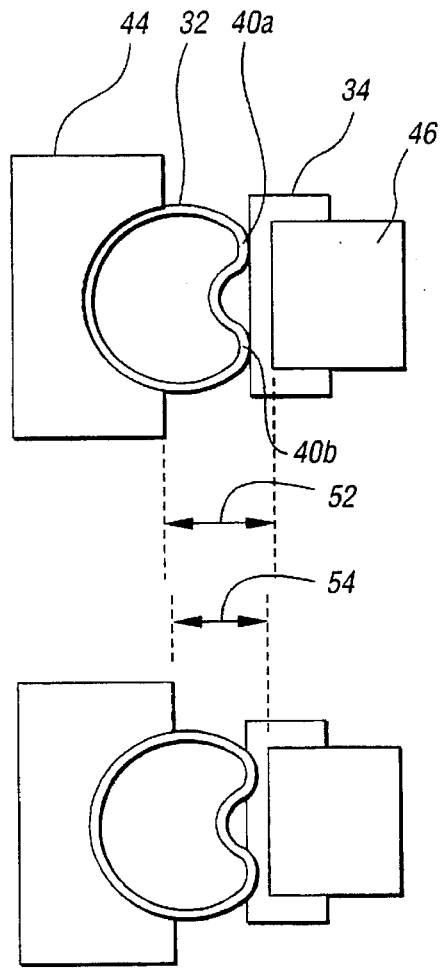
Fig. 3a
Fig. 3b
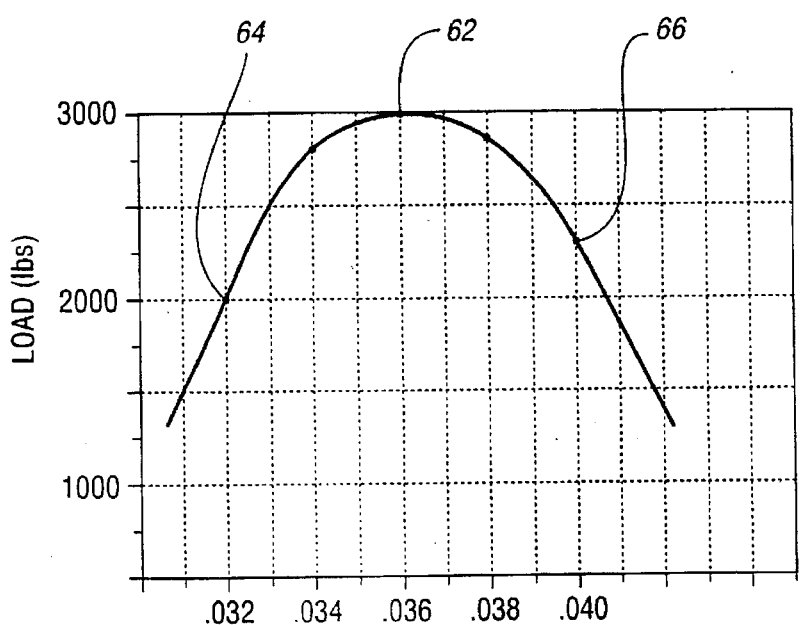
Fig. 4

5,645,738

APPARATUS AND METHOD FOR RESISTANCE WELDING TUBULAR PARTS

TECHNICAL FIELD

The present invention relates generally to welding and, more particularly, to an apparatus and method for resistance projection welding of tubular parts.

BACKGROUND ART

Tubular parts are commonly welded together by torch or arc welding processes such as TIG welding. For some wire-to-tube and tube-to-tube welding applications, such as in the manufacture of automobile seat-frame sections, it is important to ensure that the tubular parts are welded together properly. A seat-frame having defective torch or arc welded joints is expensive to replace once it is incorporated into a larger assembly. Inclusion of a defective seat-frame into a production vehicle, for example, can result in expensive warranty repairs or product recall.

The strength of a resistance welded joint depends upon the amount of penetration of the parts into each other during welding at the faying surfaces. Too much or too little weld penetration can result in a defective weld. Examples of systems monitoring the amount of weld penetration during welding are shown in U.S. Pat. No. 5,393,950 to Killian, U.S. Pat. No. 4,441,006 to Machida et al., and U.S. Pat. No. 4,296,304 to Defourney. Since the electrodes of a weld gun are in continuous contact with the parts during welding, each of these disclosed systems teaches the use of measuring electrode displacement to directly obtain the amount of weld penetration. However, these systems are directed to the resistance welding of planar parts and are not readily adaptable to tube welding applications.

Planar parts, unlike tubular parts, are usually not susceptible to undesired movement such as deformation caused by the force applied from the electrodes to the parts to effect resistance welding. Furthermore, planar parts are inherently stable and, unlike unstable tubular parts, they are also not as likely to roll, slide, or move with respect to one another when placed between the operative electrodes. As can be appreciated, any movement of the parts which is not caused by weld penetration will result in an erroneous reading of the amount of electrode displacement. This, in turn, will result in an erroneous calculation of the strength of the joint as can be appreciated when considering that electrode displacement is commonly measured with a resolution of 1/1000 of an inch.

Accordingly, it is an object of the present invention to provide an apparatus and method for properly resistance welding tubular parts.

It is another object of the present invention to provide an apparatus and method for obtaining a predetermined displacement of the electrodes during resistance welding to maximize the strength of the weld between the tubular parts.

Yet another object of the present invention is to provide an apparatus and method for determining whether the tubular parts are properly aligned prior to resistance welding.

SUMMARY OF THE INVENTION

In carrying out the above objects, a resistance projection welding apparatus and method for resistance welding tubular parts is provided. The apparatus includes a weld gun having first and second electrodes. The electrodes are displaceable relative to each other. Each of the electrodes has an arcuate contact face respectively engaging a first and a second tubular part. The electrodes engage the respective parts at a surface opposite to a desired welding location on each of the parts. The electrodes are movable to force the parts together in order to resistance weld them at the welding locations.

Each of the arcuate contact faces engages the respective tube over an arcuate angle and an axial length sufficiently large enough to distribute the force applied to each of the parts across the engaged surfaces. This limits deformation of the parts thereby minimizing displacement between the electrodes during welding.

A weld controller coupled to the weld gun applies power to the electrodes to effect welding of the tubular parts. A displacement sensor coupled to the weld gun generates a displacement sensor signal which is responsive to the displacement between the electrodes. A test computer cooperates with the displacement sensor and the weld controller. The test computer processes the displacement sensor signal to cooperate with the weld controller to terminate the power applied to the electrodes when the displacement between the electrodes during welding falls within a predetermined displacement range indicative of properly welding the parts together.

The advantages accruing to the present invention are numerous. For example, the contact faces of the electrodes are designed to prevent deformation and undesired movement of the parts during welding in order to minimize the amount of undesired displacement between the electrodes. This ensures that the displacement between the electrodes accurately reflects the penetration of the parts into each other during welding.

The test computer of the present invention then processes the displacement sensor signal to terminate the power applied to the electrodes when the displacement between the electrodes falls within a predetermined displacement range and, therefore, can be programmed to maximize the strength of the weld for different parts having a given thickness, geometry, and composition. The test computer then determines if a total amount of power applied during welding falls within a prescribed power range. As a result, each part is properly welded by assuring that the electrode displacement falls within a respective predetermined displacement range and that each part has been subjected to a proper amount of power.

The above objects and other objects, features, and advantages of the present invention will be readily apparent by one of ordinary skill in the art from the following detailed description of the present invention when taken in connection with the accompanying drawings.

BRIEF DESCRIPTION OF THE DRAWINGS

FIGS. 3A and 3B illustrate pre-weld fit-up and post-weld displacement between the electrodes of FIG. 2;

FIG. 4 is a graph of electrode displacement versus joint strength;

DETAILED DESCRIPTION OF THE INVENTION

Figure 1:
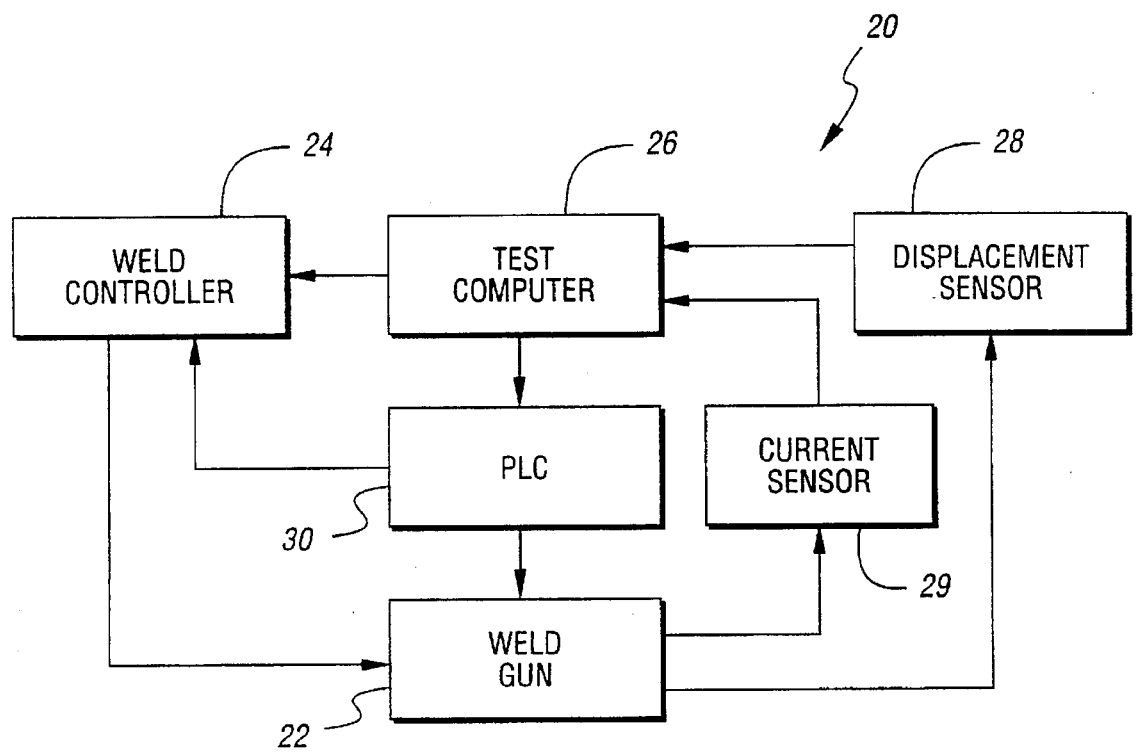
FIG. 1 is a schematic block diagram illustrating an embodiment of the present invention.

FIG. 1 illustrates a block diagram of an embodiment of a resistance projection welding apparatus 20. Welding apparatus 20 includes a weld gun 22. As described below, weld gun 22 is a conventional two electrode weld gun which may be obtained from manufacturers such as Milco, Savair, Grossel, OHMA or Centerline. The electrodes of weld gun 22 receive electrical welding power from a conventional weld controller 24. Weld controller 24 likewise is a conventional device and can be obtained from a number of manufacturers such as Weltronics, Medar or Square D.

A displacement sensor 28 is coupled to weld gun 22. Displacement sensor 28 monitors the displacement between the electrodes during the welding process. Displacement sensor 28 is a transducer such as a Linear Variable Displacement Transducer (LVDT) described in U.S. Pat. Nos. 5,288,968, 5,220,145, and 4,542,277, all of which are issued to the present Applicant, which are incorporated herein for the purpose of describing the sensor and related control logic. Displacement sensor 28 generates a displacement sensor signal which is responsive to the displacement between the electrodes during the welding procedure.

Test computer 26 cooperates with displacement sensor 28 to process the displacement signal in order to instruct weld controller 24 to initiate and inhibit the welding power applied to the electrodes in weld gun 22. Computer 26 issues commands to weld controller 24 based on the displacement signal to terminate the welding power when the value of the displacement signal indicates a proper weld between the workpieces.

A current sensor or inductor 29 is coupled to weld gun 22. Current sensor 29 monitors the welding power applied by the electrodes to the workpieces. Test computer 26 communicates with current sensor 29 and weld controller 24 to vary the welding power during welding. Computer 26 also determines if a total amount of welding energy applied during the welding duration falls within a prescribed range to identify workpieces which have been subjected to the proper amount of welding energy.

In a preferred construction of welding apparatus 20, a Programmable Logic Controller (PLC) 30 is coupled to weld gun 22 and weld controller 24 in addition to being responsive to test computer 26. PLC 30 performs such functions as turning weld controller 24 on and off, moving the electrodes of weld gun 22 between an opened and a closed position, and controlling the clamping pressure of the electrodes. PLC 30 performs all of these functions based on instructions from test computer 26. PLC 30 is a readily available component obtainable from Allen Bradley. Computer 26 may perform all of the functions of PLC 30. Accordingly, for simplicity, the present invention will be described as assuming that computer 26 handles all of the tasks of PLC 30.

Figure 2:
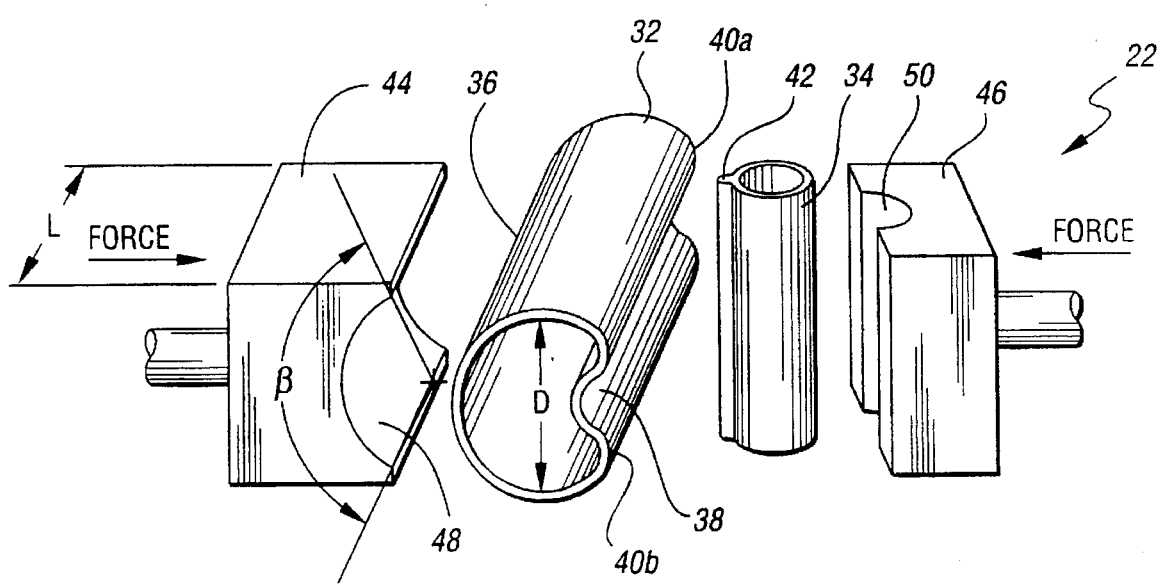
FIG. 2 illustrates a weld gun electrode set according to a preferred embodiment of the present invention for a tube-to-tube welding application.

FIG. 2 illustrates a tube-to-tube welding application according to the present invention. Specifically, a head-rest tube 34 is to be welded to a seat-frame tube 32. This welding application is commonly done in the manufacture of automobile seats using torch or arc welding methods. Seat-frame tube 32 and head-rest tube 34 are uniquely formed to facilitate resistance welding. Seat-frame tube 32 has an annular cross section 36 with a concave surface portion 38. Annular section 36 and concave portion 38 intersect to define two spaced apart parallel ridges 40a and 40b running along the length of tube 32. Head-rest tube 34 has a ridge 42 running along its length. Parallel ridges 40a and 40b and ridge 42 are projected surfaces which are suitable for resistance welding.

As mentioned above, weld gun 22 is a two electrode gun having a first electrode 44 and a second electrode 46 as shown in FIG. 2. First electrode 44 has an arcuate contact face 48 engaging seat-frame tube 32 at a surface on annular section 36 opposite to concave portion 38. Each of the electrodes have an arcuate contact face respectively engaging a first and a second tubular part at a surface opposite to a welding location, or faying surface, on each of the parts. Second electrode 46 has an arcuate contact face 50 engaging head-rest tube 34 at a surface opposite to ridge 42. Electrodes 44 and 46 are movable to force ridge 42 of head-rest tube 34 across parallel ridges 40a and 40b of seat-frame tube 32. Ridge 42 and ridges 40a and 40b become molten under the application of sufficient welding current to electrodes 44 and 46 thereby enabling head-rest tube 34 to be welded to seat-frame tube 32.

Each arcuate contact face 48 and 50 are sufficiently large enough to distribute the force applied by electrodes 44 and 46 evenly across respective tubes 32 and 34. This prevents deformation of tubes 32 and 34 during the application of force and thereby minimizes tube flexing and undesired displacement between electrodes 44 and 46. Furthermore, contact faces 48 and 50 are also designed to hold tubes 32 and 34 steadily and properly aligned together in order to prevent any undesired movement susceptible to occur between tubular parts. Preferably, each of contact faces 48 and 50 has an arcuate angle ($\beta$) of tube engagement between 120° and 180° of the tubular part circumference and an axial length (L) greater than the diameter (D) of the tubular part engaged by the contact face. Most preferably, the arcuate angle is in the 160° to 180° range. Thus, the displacement monitored during welding will be a good relative indicator of the amount of weld penetration between the parts.

In order to produce a good weld between seat-frame tube 32 and head-rest tube 34, the tubes must penetrate into each other at the faying surfaces a desired amount dependent upon the thicknesses, geometries, and compositions of the materials. Too much or too little weld penetration will result in a weak weld between the tubes. Since electrodes 44 and 46 are forcing the tubes together during the welding process, the amount of weld penetration of the tubes is equal to the amount that the electrodes move inward from a pre-weld fit-up position less any tube deflection.

As shown in FIG. 3A, electrodes 44 and 46 are at a pre-weld fit-up position 52 having a displacement value initialized to 0. When welding power is applied, tubes 32 and 34 penetrate each other. After the power is terminated and the materials have cooled, electrodes 44 and 46 are at a post-weld displacement position 54 as shown in FIG. 3B with a displacement value equaling the amount of weld penetration of tubes 32 and 34. Thus, electrodes 44 and 46 have moved or been "displaced" from the pre-weld fit-up position a distance equaling the amount of weld penetration.

FIG. 4 shows a graph illustrating how the strength of a weld is dependent upon the amount of electrode displacement. As shown in FIG. 4, a maximum strength point 62 is obtained when the electrode displacement equals 0.036 inches. Point 62 corresponds to a weld being able to withstand 3000 lb loads. End points 64 and 66 both represent a displacement deviance of 0.004 inches from maximum point 62 displacement value of 0.036 inches. End points 64 and 66 correspond to a weld being able to withstand 2000 and 2300 lb loads respectively. Thus, if the specifications of the welding application call for welds having at least a strength of 2000 lbs, a displacement value falling within the final displacement "envelope", or predetermined displacement range, of 0.032 to 0.040 inches will suffice. The predetermined displacement range is indicative of properly welding seat-frame tube 32 and head-rest tube 34 together for specifications calling for at least 2000 lb. strength.

With continuing reference to FIGS. 1, 2, 3A, 3B, and 4, test computer 26 processes the displacement sensor signal from displacement sensor 28 to cooperate with weld controller 24 to terminate the welding power applied to electrodes 44 and 46 when the electrode displacement during welding falls within the predetermined displacement range.

Figure 5:
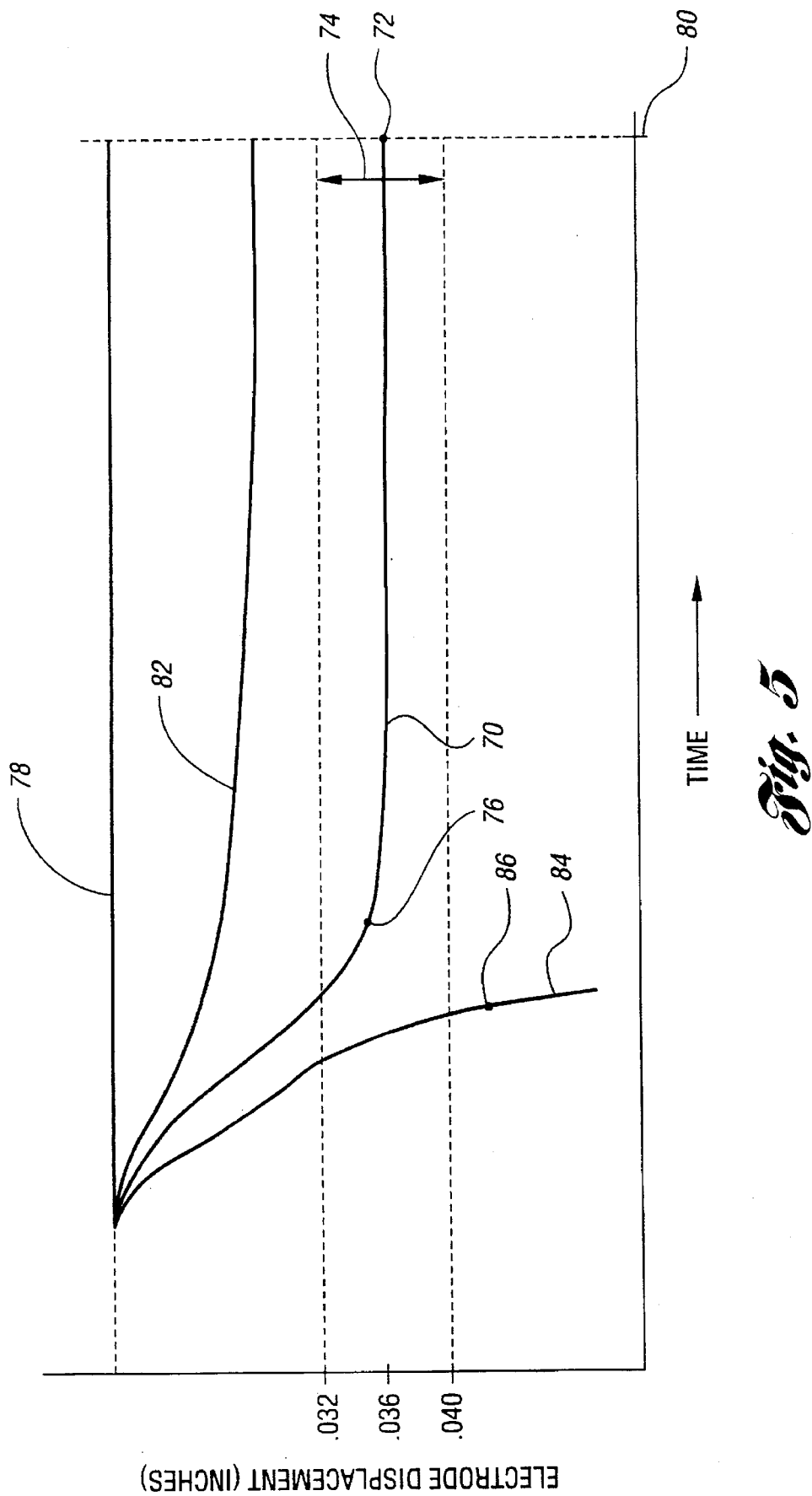
FIG. 5 is a series of electrode displacement versus time curves which compare a good weld to three weld-fault conditions.

FIG. 5 shows a series of curves which compare the amount of electrode displacement over the time which welding power is applied. Displacement curve 70 represents a proper weld having a final displacement 72 falling within the predetermined displacement range 74. Ideally, test computer 26 terminates the welding power at a termination time 76 when the displacement falls within predetermined range 74 and before it reaches the maximum strength displacement of 0.036 inches as described in FIG. 4. However, since the power is applied in cycles, test computer 26 terminates the power after a complete energy cycle which may cause a deviance from the desired displacement of 0.036 inches. After the termination of power, the workpieces penetrate slightly further into each other as they cool as shown by curve 70. Thus, terminating the power when the displacement is initially within the predetermined range 74 will ensure a proper weld.

According to a feature of the present invention, test computer 26 is able to identify improper welds. For instance, curve 78 represents a weld having a final displacement value of 0 inches measured from the pre-weld fit-up position at a pre-set time limit 80. This condition occurs because the workpieces have not been subjected to any welding power as a result of either not forming a closed electrical circuit with the electrodes or because the weld controller is inoperative. In any event, test computer 26 recognizes that the final displacement value of 0 is not within predetermined range 74 and it will indicate a fault condition.

Still referring to FIG. 5, test computer 26 can also identify workpieces which have not penetrated far enough into each other after being welded. For example, curve 82 has a final marginal displacement value at time limit 80. This condition occurs because of the presence of oil or other contaminants on the workpieces or electrodes inhibiting the flow of welding power. As the case for no weld curve 78 mentioned above, test computer 26 recognizes that the final displacement value is not within predetermined range 74 and it will indicate a fault condition.

Finally, test computer 26 will detect a weld having too much displacement. Curve 84 represents the electrode displacement pattern due to severe expulsion. Expulsion occurs when the materials are poorly fit up or subjected to an excessive amount of welding power. Test computer 26 recognizes this condition when the electrode displacement is greater than the largest displacement value in predetermined range 74 and it will instruct weld controller 24 to terminate the welding power as shown at termination time 86.

Figure 6:
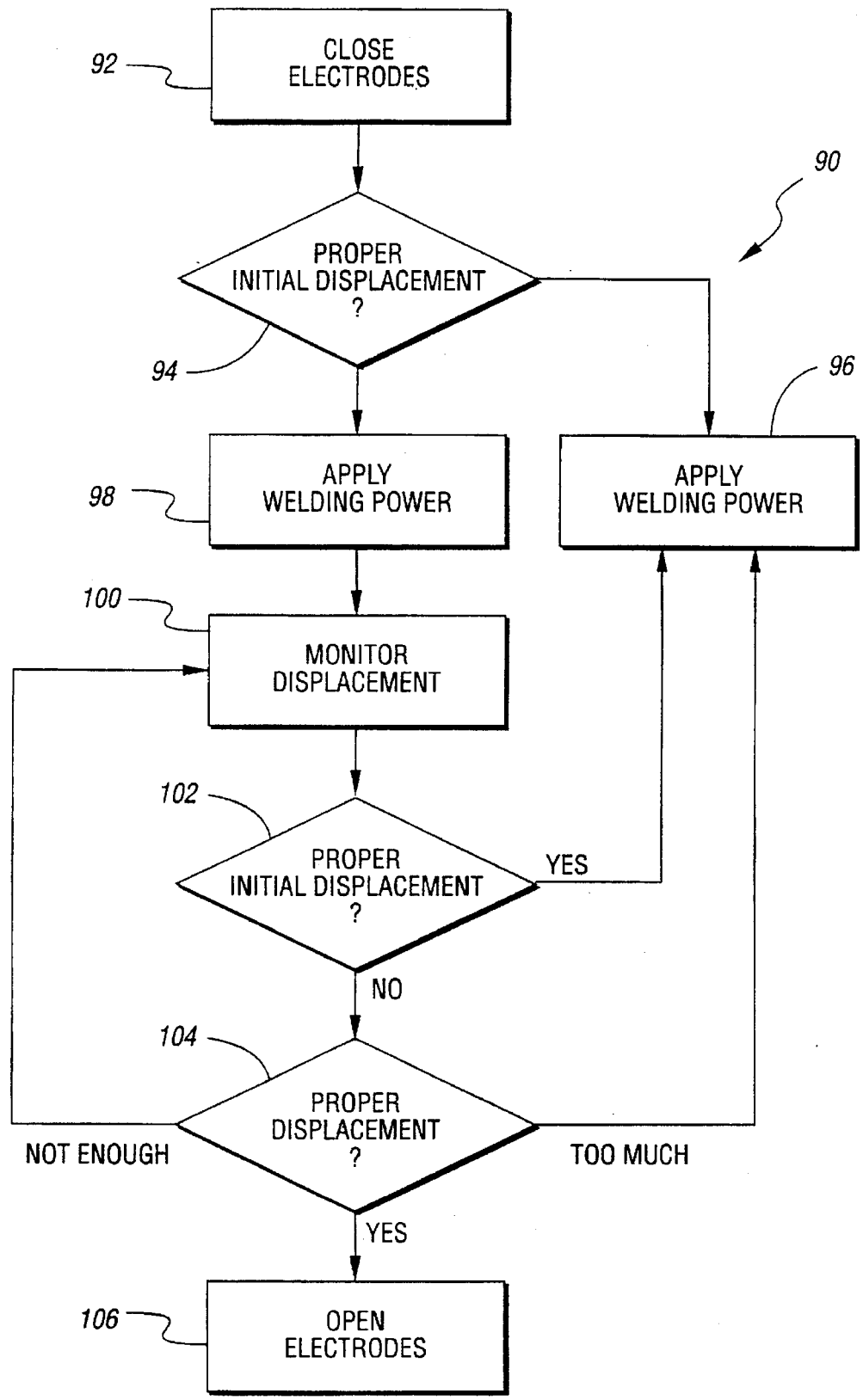
FIG. 6 is a flow chart illustrating the method according to the present invention.

FIG. 6 is a flow chart illustrating a resistance projection welding method 90 according to the present invention. The first step of welding method 90 is to move the electrodes to the pre-weld position thereby forming a closed electrical circuit with the workpieces as shown in block 92. With reference to FIG. 3A, test computer 26 determines if the pre-weld displacement between electrodes 44 and 46 is within an acceptable region of a predetermined initial displacement value for pre-weld fit-up position 52 as shown in decision block 94. If the pre-weld displacement value is within a specified rejection region, a result due to such things as the electrodes engaging the wrong surfaces of the workpieces, a workpiece being missing, the electrode contact faces being worn down or other factors, then test computer 26 inhibits the application of power and indicates a fault condition as shown in block 96. Also, computer 26 monitors the amount of pressure applied by the electrodes in the pre-weld position. The pressure must be within a desired range before computer 26 will initiate application of welding power.

If computer 26 determines the pre-weld displacement value to be within the acceptable region of pre-weld fit-up position 52 and the pressure is within the desired range, then computer 26 will instruct weld controller 24 to apply welding power to electrodes 44 and 46 as shown in block 98. Computer 26 then monitors the displacement between the electrodes during welding by processing the displacement sensor signal as shown in block 100.

With reference to FIG. 5, computer 26 determines if the displacement has not reached a value within predetermined range 74 at pre-set time limit 80 as shown in decision block 102. If this condition occurs then computer 26 will indicate a fault condition as shown in block 96 and take the appropriate step of terminating the welding power and instructing the operator to appropriately handle the improperly welded part.

If the pre-set time limit has not expired, computer 26 will determine if the displacement falls within predetermined range 74 as shown in decision block 104. If the displacement is higher than the largest value in predetermined range 74, a result of expulsion, then computer 26 will indicate a fault condition as shown in block 96 and terminate the welding power. If the displacement is lower than the lowest displacement value in predetermined range 74 and the pre-set time limit has not expired, then test computer 26 will loop back to block 100 and keep on continually monitoring the displacement data while welding power is applied. Finally, if the displacement falls within predetermined range 74, indicative of a proper weld, computer 26 will terminate the welding power and instruct electrodes 42 and 44 to open to enable the removal of the welded parts and the insertion of new parts as shown in block 106.

Figure 7:
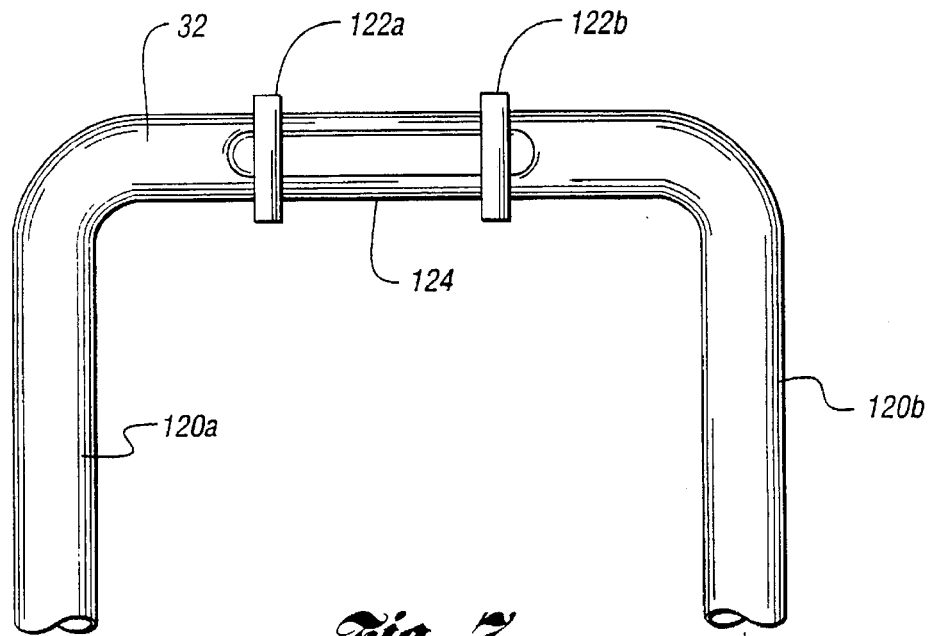
FIG. 7 illustrates the tube-to-tube welding application of FIG. 2.

FIG. 7 illustrates an upper portion of finished welded head support structure of a seat-frame back section. Seat-frame back is made up of a generally "U" shaped tube 32 having two legs 120a and 120b and a horizontal bight section 124. Legs 120a and 120b are secured to the seat base (not shown). Two-head rest tubes 122a and 122b are welded to bight section 124 of seat-frame "U" shaped tube 32 in accordance with the teachings of the present invention.

Figure 8:
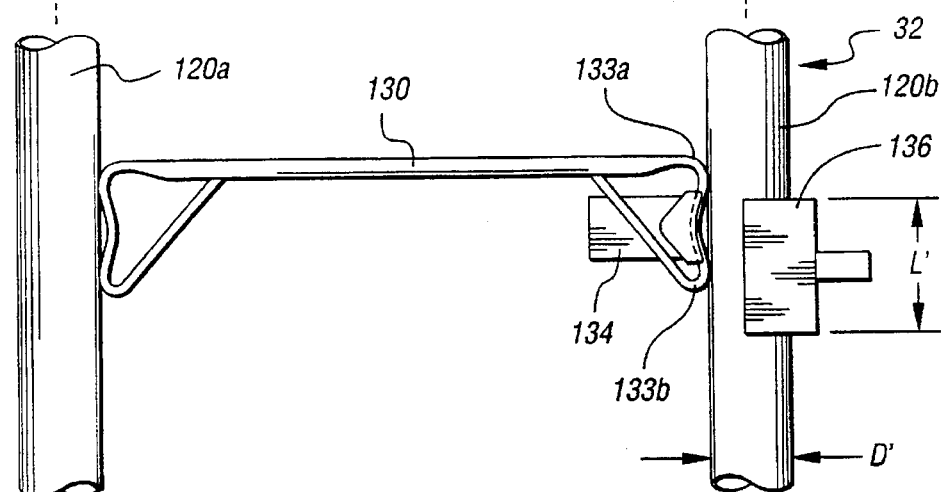
FIG. 8 illustrates a wire-to-tube welding application.

As can be appreciated by those skilled in the art, the teachings of the present invention are also suitable to the resistance welding of wire parts. For instance, as shown in FIG. 8 a wire-to-tube welding application is illustrated for welding the remaining structure of the automobile seat-frame.

A cross support wire 130 can be resistance welded to tube legs 120a and 120b of "U" shaped tube 32. Support wire 130 has a pair of axially spaced apart projections 133a and 133b. Since wire 130 is welded to each tube leg in the same manner, only the description of one weld joint will be described. A first electrode 134 engages wire 130 between projections 133a and 133b. This enables the welding power and force to be directed through projections 133a and 133b to facilitate welding. A second electrode 136 engages leg 120b. Electrodes 134 and 136 are moved together to force wire 130 against leg 120b to resistance weld the parts together through projections 133a and 133b as taught above.

Figure 9:
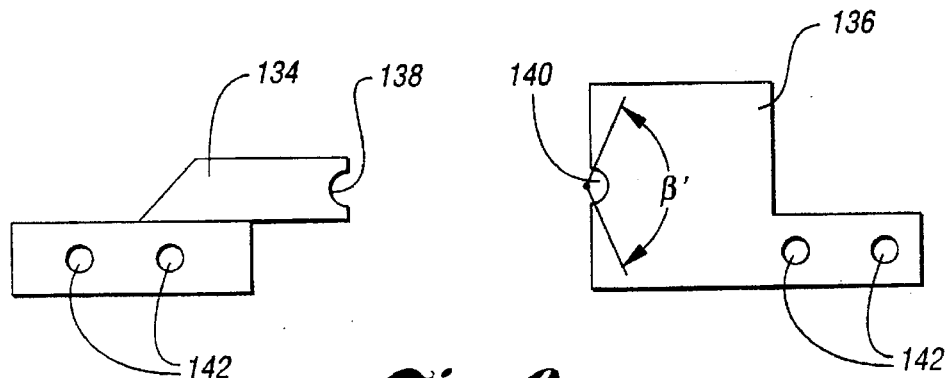
FIG. 9 illustrates a pair of electrodes used in the wire-to-tube welding application shown in FIG. 8.

FIG. 9 shows in greater detail electrodes 134 and 136. Electrode 134 has an arcuate contact face 138 formed for engaging wire 130. Similarly, electrode 136 has an arcuate contact face 140 formed for engaging leg 120b. As taught above, arcuate contact face 140 has an arcuate angle ($\beta'$) and an axial length (L') (shown in FIG. 8) sufficiently large enough to distribute the force applied to leg 120b evenly across the engaged surface to prevent any lateral deformation of leg 120b. This helps minimize undesired displacement between electrodes 134 and 136 during welding. Preferably, arcuate contact face 140 has an arcuate angle of tube engagement between 120° and 180° of the tubular part circumference and an axial length greater than the diameter (D') of leg 120b. And most preferably the arcuate angle is in the 160° to 180° range. Finally, each of electrodes 134 and 136 have mounting holes 142 which attach to a weld gun in order to apply pressure and welding power to the workpieces while monitoring the displacement between the electrodes.

Figures 10, 11:
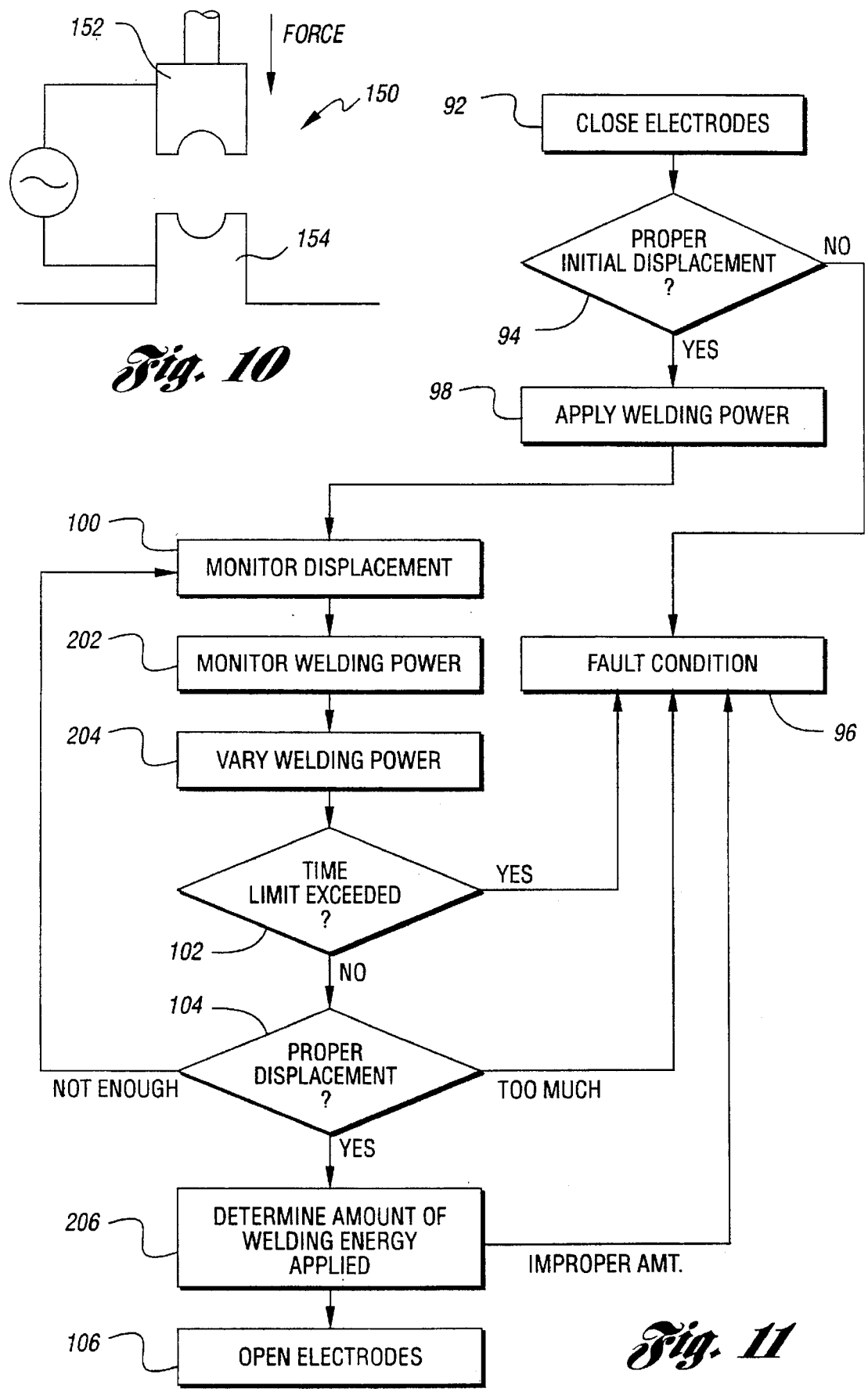
FIG. 10 illustrates an electrode set according to a second embodiment of the present invention.
FIG. 11 is a flow chart illustrating additional steps according to the present invention.

As can be appreciated by those skilled in the art, it is not necessary for both electrodes to be movable in order to monitor the displacement between the electrodes. For instance, as shown in FIG. 10, another embodiment of a resistance projection welding apparatus 150 is illustrated as having a movable or welding electrode 152 and a stationary electrode or fixture 154. Electrodes 152 and 154 are coupled to a power source, such as a weld controller, for receiving welding power to weld parts. Welding electrode 152 is displaceable relative to stationary electrode 154. As evident from the teachings above, the amount of displacement of welding electrode 152 relative to stationary electrode 154 during welding can be used to determine whether the parts are properly welded together.

Furthermore, the displacement of a movable electrode relative to a stationary part can be used to determine whether a part engaged by the movable electrode is properly welded to the stationary part. Of course, the stationary part and the movable electrode have to be coupled to a common welding power source to effect welding of the parts.

With reference to FIGS. 1 and 6, FIG. 11 is a flow chart describing a resistance welding method 200. Welding method 200 is the same method shown in FIG. 6, but describes the additional features of the present invention associated with current sensor 29 of FIG. 1. For convenience, all the steps in FIG. 11 which are shown in FIG. 6 have the same reference numeral and will not be further described. The additional steps of welding method 200 include monitoring the welding power during welding with current sensor 29 as shown block 202. Test computer 26 then communicates with current sensor 29 and weld controller 24 to vary the welding power during welding as shown in block 204 to maintain the power within a prescribed range.

Additionally, test computer 26 determines the total energy applied by the electrodes to the weld joint during the entire welding process. This total energy value is compared to a prescribed range stored in memory of test computer 26 and a fault is indicated as shown in block 96 if too much or too little energy is used. Using too much energy may cause some materials to overheat and become brittle, even though it has proper weld penetration.

It is to be understood, of course, that while the forms of the present invention above constitute the preferred embodiments of the invention, the preceding description is not intended to illustrate all possible forms thereof. It is also to be understood that the words used are words of description, rather than limitation, and that various changes may be made without departing from the spirit and scope of the present invention, which should be construed according to the following claims.

What is claimed is:

1. A resistance projection welding apparatus for resistance welding tubular parts together, said apparatus comprising:

a weld gun having a first and a second electrode being displaceable relative to each other, said first and said second electrode respectively having a first and a second arcuate contact face, said first and said second arcuate contact face respectively engaging a first and a second tubular part at a surface opposite to a welding location on said first and said second tubular part, said first and said second electrode being movable to apply a force to said first and said second tubular part to force them together for resistance welding them at said welding location;

wherein said first and said second arcuate contact face respectively engage said first and said second tubular part over an arcuate angle and an axial length sufficiently large enough to distribute the force applied to said first and said second tubular part to limit deformation of said first and said second tubular part thereby minimizing displacement between said first and said second electrode;

a weld controller coupled to the weld gun for applying a welding power to said first and said second electrode;

a displacement sensor coupled to the weld gun for generating a displacement sensor signal responsive to displacement between said first and said second electrode; and a test computer cooperating with the displacement sensor and the weld controller, said test computer processes the displacement sensor signal to cooperate with said weld controller to terminate the welding power when displacement between said first and said second electrode falls within a predetermined displacement range indicative of properly resistance welding said first and said second tubular part together.

2. The apparatus of claim 1 wherein the test computer communicates with the weld gun to control the force applied to said first and said second tubular part.

3. The apparatus of claim 1 wherein said first and said second arcuate contact face has an arcuate angle of tube engagement between 120° and 180° of a respective circumference of said first and said second tubular part.

4. The apparatus of claim 1 wherein said first and said second arcuate contact face has an arcuate angle of tube engagement between 160° and 180° of the respective circumference of said first and said second tubular part.

5. The apparatus of claim 1 wherein said first and said second arcuate contact face engage said first and said second tubular part over an axial length greater than a respective diameter of said first and said second tubular part.

6. The apparatus of claim 1 further comprising:
a current sensor coupled to the weld gun, said current sensor monitoring the welding power applied by said first and said second electrode;
wherein said test computer cooperates with said current sensor and said weld controller to vary the welding power during welding.

7. The apparatus of claim 1 further comprising:
a current sensor coupled to the weld gun, said current sensor monitoring the welding power applied by said first and said second electrode;
wherein said test computer cooperates with said weld controller and said current sensor to determine if a total amount of welding energy applied during welding falls within a prescribed range.

8. The apparatus of claim 1 wherein the test computer cooperates with the weld controller to terminate the welding power after expiration of a pre-set time limit.

9. The apparatus of claim 1 wherein the test computer processes the displacement sensor signal to determine if a pre-weld displacement between said first and said second electrode is within or outside a specified rejection region, said test computer cooperates with the weld controller to initiate an application of welding power to said first and said second electrode if the pre-weld displacement is outside the specified rejection region, and inhibits the application of welding power if the pre-weld displacement is within the specified rejection region.

10. The apparatus of claim 1 wherein the test computer cooperates with the weld controller to terminate the welding power when displacement between said first and said second electrode is greater than a largest value in the predetermined displacement range.

11. A resistance projection welding apparatus for resistance welding a wire to a tube, the wire having a pair of axially spaced apart projections located on a welding surface, said apparatus comprising:
a weld gun having a first and a second electrode being displaceable relative to each other, said first electrode having a first arcuate contact face engaging the wire between the pair of axially spaced apart projections at a surface opposite to the welding surface, said second electrode having a second arcuate contact face engaging the tube at a given surface, said first and said second electrode being movable to apply a force to the wire and the tube to force them together for resistance welding said wire to said tube through said pair of projections;
wherein said second arcuate contact face engages the tube over an arcuate angle and an axial length sufficiently large enough to distribute the force applied to the tube to limit deformation of said tube thereby minimizing displacement between said first and said second electrode;
a weld controller coupled to the weld gun for applying a welding power to said first and said second electrode to effect welding of the wire to the tube;
a displacement sensor coupled to the weld gun for generating a displacement sensor signal responsive to displacement between said first and said second electrode; and
a test computer cooperating with the displacement sensor and the weld controller, said test computer processes the displacement sensor signal to cooperate with said weld controller to terminate the welding power when displacement between said first and said second electrode during welding falls within a predetermined displacement range indicative of properly resistance welding the wire to the tube.

12. The apparatus of claim 11 wherein the second arcuate contact face has an arcuate angle of tube engagement between 120° and 180° of a circumference of the tube.

13. The apparatus of claim 11 wherein the second arcuate contact face engages the tube over an axial length greater than a diameter of the tube.

14. A resistance projection welding apparatus for resistance welding a head-rest tube to a seat-frame tube, the seat-frame tube having an annular cross section with a concave portion defining two parallel ridges, said apparatus comprising:
a weld gun having a first and a second electrode being displaceable relative to each other, said first electrode having a first arcuate contact face engaging the seat-frame tube at a surface opposite to the concave portion, said second electrode having a second arcuate contact face engaging the head-rest tube at a given surface, said first and said second electrode being movable to apply a force to said head-rest tube and said seat-frame tube to force them together for resistance welding said head-rest tube across the two parallel ridges of said seat-frame tube;
wherein said first and said second arcuate contact face respectively engage said seat-frame tube and said head-rest tube an arcuate angle and an axial length sufficiently large enough to distribute the force applied to each of the tubes to limit deformation of said tubes thereby minimizing displacement between said first and said second electrode;
a weld controller coupled to the weld gun for applying a welding power to said first and said second electrode;
a displacement sensor coupled to the weld gun for generating a displacement sensor signal responsive to displacement between said first and said second electrode; and
a test computer cooperating with the displacement sensor and the weld controller, said test computer processes the displacement sensor signal to cooperate with said weld controller to terminate the welding power when displacement between said first and said second electrode during welding falls within a predetermined range indicative of properly resistance welding the head-rest tube to the seat-frame tube.

15. The apparatus of claim 14 wherein said first and said second arcuate contact face has an arcuate angle of tube engagement between 120° and 180° of a respective circumference of said seat-frame tube and said head-rest tube.

16. The apparatus of claim 14 wherein said first and said second arcuate contact face engage the seat-frame tube and the head-rest tube over an axial length greater than a respective diameter.

17. The resistance welding apparatus of claim 14 wherein the head-rest tube has a ridged surface opposite to the given surface.

18. A resistance projection welding apparatus for resistance welding tubular parts together, said apparatus comprising:
a stationary electrode having a first arcuate contact face engaging a first tubular part;
a weld gun having a welding electrode being displaceable relative to the stationary electrode, said welding electrode having a second arcuate contact face engaging a second tubular part, said welding electrode being movable to apply a force to the second tubular part and the first tubular part to resistance weld them together;

wherein said first and said second arcuate contact face respectively engage said first and said second tubular part over an arcuate angle and an axial length sufficiently large enough to distribute the force applied to said first and said second tubular part to limit deformation of said first and said second tubular part thereby minimizing displacement between said stationary and said welding electrode;

a weld controller coupled to the weld gun and the stationary electrode for applying a welding power to the stationary and the welding electrode to effect welding of the first and the second tubular part;

a displacement sensor coupled to the weld gun for generating a displacement sensor signal responsive to displacement between the stationary and the welding electrode; and a test computer cooperating with the displacement sensor and the weld controller, said test computer processes the displacement sensor signal to cooperate with said weld controller to terminate the welding power when displacement between the stationary and the welding electrode falls within a predetermined displacement range indicative of properly resistance welding the first and the second tubular part together.

19. A method for resistance projection welding a first and a second tubular part together, said method comprising the steps of:

providing a weld gun having a first and a second electrode being displaceable relative to each other, said first and said second electrode having a first and a second arcuate contact face, said first and said second arcuate contact face respectively engaging the first and the second tubular part at a surface opposite to a predetermined welding surface on said first and said second tubular part;

moving said first and said second electrode to apply a force to said first and said second tubular part to force them together for resistance welding them at the predetermined welding surface;

distributing the force applied to said first and said second tubular part to limit deformation to minimize displacement between said first and said second electrode by utilizing sufficiently large enough first and second arcuate contact faces;

applying a welding power to said first and said second electrode by utilizing a weld controller;

generating a displacement signal responsive to displacement between said first and said second electrode during welding using a displacement sensor coupled to the weld gun;

processing the displacement signal by using a test computer in cooperation with the displacement sensor; and terminating the welding power when displacement between said first and said second electrode falls within a predetermined displacement range indicative of properly resistance welding said first and said second tubular part together by using the test computer in cooperation with the weld controller.

20. The method of claim 19 wherein the step of processing the displacement signal by using a test computer in cooperation with the displacement sensor further comprises the steps of:

determining whether a pre-weld displacement between said first and said second electrode is within or outside a specified rejection region; and initiating the welding power if the pre-weld displacement is outside the specified rejection region, and inhibiting the welding power if the pre-weld displacement is within the specified rejection region.

21. The method of claim 19 further comprising the step of terminating the welding power after expiration of a pre-set time limit.

22. The method of claim 19 further comprising the step of terminating the welding power when displacement between said first and said second electrode during welding is greater than a largest value in the predetermined displacement range.

23. The method of claim 19 further comprising the steps of:

monitoring the welding power applied by said first and said second electrode by using a current sensor coupled to the weld gun; and varying the welding power during welding by utilizing said test computer in cooperation with said current sensor and said weld controller.

24. The method of claim 19 further comprising the steps of:

monitoring the welding power applied by said first and said second electrode by using a current sensor coupled to the weld gun; and determining if a total amount of welding energy applied during welding falls within a prescribed range by utilizing said test computer in cooperation with said current sensor.

25. A seat-frame back section comprising:

a general "U" shaped tube having a general horizontal bight section with an annular cross section and a concave portion defining at least two spaced apart parallel ridges and a pair of spaced apart side sections extending from the horizontal bight section; and a pair of head-rest mounting tubes each being resistance welded to the horizontal bight section and joined to the at least two spaced apart parallel ridges of the horizontal bight section.

26. The seat-frame back section of claim 25 further comprising at least one wire having at each end a loop with a pair of spaced apart projections, each loop being resistance welded to the pair of spaced apart side sections through the pair of projections to securely mount the at least one wire across the side sections.

27. The seat-frame back section of claim 25 wherein the pair of head-rest mounting tubes each has a ridge, the pair of head-rest tubes each being resistance welded to the horizontal bight section through each ridge.

* * * * *